(12) United States Patent
MacFarlane et al.

(10) Patent No.: US 11,338,400 B2
(45) Date of Patent: May 24, 2022

(54) DOUBLE ROW COMPRESSOR STATORS

(71) Applicant: PRATT & WHITNEY CANADA CORP., Longueuil (CA)

(72) Inventors: Ian A. MacFarlane, Saint-Bruno-de-Montarville (CA); Peter Townsend, Mississauga (CA); Hong Yu, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/318,414

(22) Filed: May 12, 2021

(65) Prior Publication Data

US 2021/0260706 A1 Aug. 26, 2021

Related U.S. Application Data

(62) Division of application No. 16/153,526, filed on Oct. 5, 2018, now Pat. No. 11,033,992.

(51) Int. Cl.
*B23P 15/04* (2006.01)
*B33Y 10/00* (2015.01)
(Continued)

(52) U.S. Cl.
CPC .............. *B23P 15/04* (2013.01); *B22F 10/20* (2021.01); *B33Y 10/00* (2014.12); *B33Y 80/00* (2014.12);
(Continued)

(58) Field of Classification Search
CPC .......... B23P 15/04; B22F 10/20; B22F 10/40; B22F 5/106; B22F 2003/247;
(Continued)

(56) References Cited

U.S. PATENT DOCUMENTS 5,344,283 A 9/1994 Magowan et al.
8,573,941 B2 11/2013 Hoeger
(Continued)

FOREIGN PATENT DOCUMENTS

EP  3569817 A1  11/2019
WO  2015006329 A1  1/2015
WO  2016142631 A1  9/2016

OTHER PUBLICATIONS

European Patent Office, Communication re. extended European search report for European Application No. 19201758, dated Mar. 2, 2020.
(Continued)

*Primary Examiner* — Lawrence Averick
(74) *Attorney, Agent, or Firm* — Norton Rose Fulbright Canada LLP

(57) ABSTRACT

A method of manufacturing a compressor stator having: a first stator blade with a first leading edge and a first trailing edge; a second stator blade disposed a circumferential distance from the first stator blade, the second stator blade having a second leading edge disposed an axial distance from the first leading edge and a second trailing edge disposed an axial distance from the first trailing edge; the method comprising: using additive manufacturing to deposit and fuse together progressive layers of metal material commencing at a substrate to form the first stator blade, the second stator blade, at least one intermediate support structure disposed between the first stator blade and the second stator blade, and at least one primary support structure disposed between the substrate and at least one of: the first stator blade; and the second stator blade; and removing the primary support structure and the intermediate support structure.

3 Claims, 4 Drawing Sheets

(51) Int. Cl.
  *B33Y 80/00* (2015.01)
  *F01D 9/04* (2006.01)
  *F01D 25/28* (2006.01)
  *B22F 10/20* (2021.01)

(52) U.S. Cl.
  CPC .......... *F01D 9/041* (2013.01); *F01D 25/285* (2013.01); *F05D 2220/3216* (2013.01); *F05D 2230/31* (2013.01); *F05D 2240/12* (2013.01)

(58) Field of Classification Search
  CPC .. B22F 2998/10; B22F 2999/00; B22F 5/009; B33Y 10/00; B33Y 80/00; F01D 9/041; F01D 25/285; F01D 5/146; F01D 9/044; F05D 2220/3216; F05D 2230/31; F05D 2240/12; F05D 2230/22; F05D 2230/234; F04D 29/023; F04D 29/542; B23K 26/342; B23K 2101/001; Y02P 10/25
  See application file for complete search history.

(56) References Cited

U.S. PATENT DOCUMENTS

| | | | |
|---|---|---|---|
| 9,266,170 B2 * | 2/2016 | Godfrey | ................. C30B 11/00 |
| 9,951,635 B2 | 4/2018 | Guemmer | |
| 9,957,806 B2 | 5/2018 | Johann et al. | |
| 10,513,782 B2 * | 12/2019 | Walker | .................... C23C 24/08 |
| 10,605,092 B2 * | 3/2020 | Xu | .......................... F01D 9/023 |
| 2008/0014457 A1 | 1/2008 | Gennaro et al. | |
| 2011/0211945 A1 * | 9/2011 | Ferrer | ........................ B21J 1/04 |
| | | | 415/200 |
| 2012/0222306 A1 | 9/2012 | Mittendorf et al. | |
| 2013/0195673 A1 * | 8/2013 | Godfrey | .................... B22F 7/06 |
| | | | 416/241 R |
| 2014/0182292 A1 | 7/2014 | Hudon et al. | |
| 2015/0322818 A1 | 11/2015 | Hannam et al. | |
| 2016/0069198 A1 | 3/2016 | Zelesky | |
| 2017/0021606 A1 | 1/2017 | Mironets et al. | |
| 2018/0010465 A1 * | 1/2018 | Xu | .......................... F01D 11/08 |
| 2018/0044798 A1 * | 2/2018 | Walker | ................. F01D 5/3007 |

OTHER PUBLICATIONS

Google, English translation of WO2016142631A1, Sep. 15, 20216, https://patents.google.com/patent/WO2016142631A1/en?oq=WO2016142631, accessed on May 12, 2021.

* cited by examiner

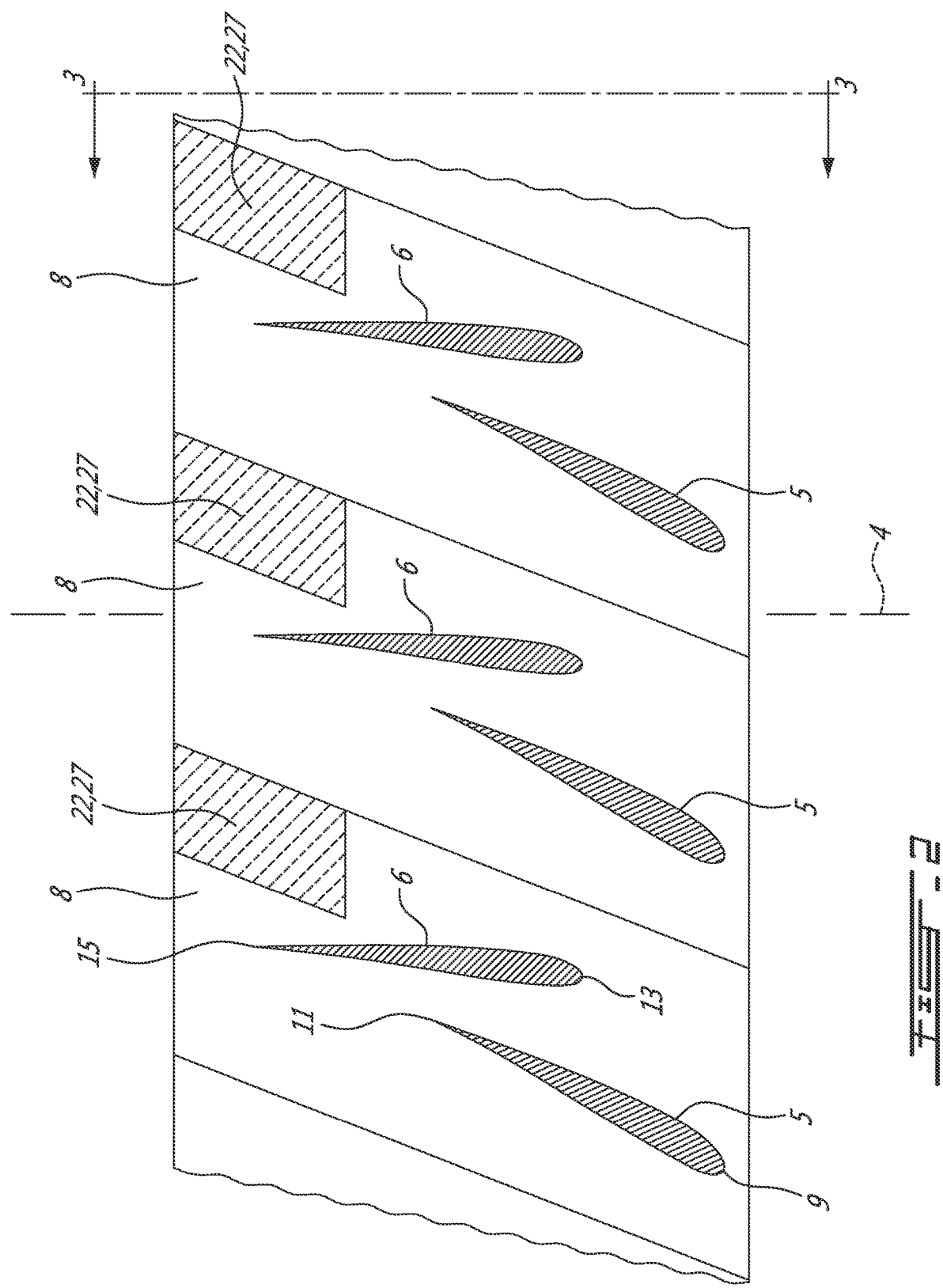

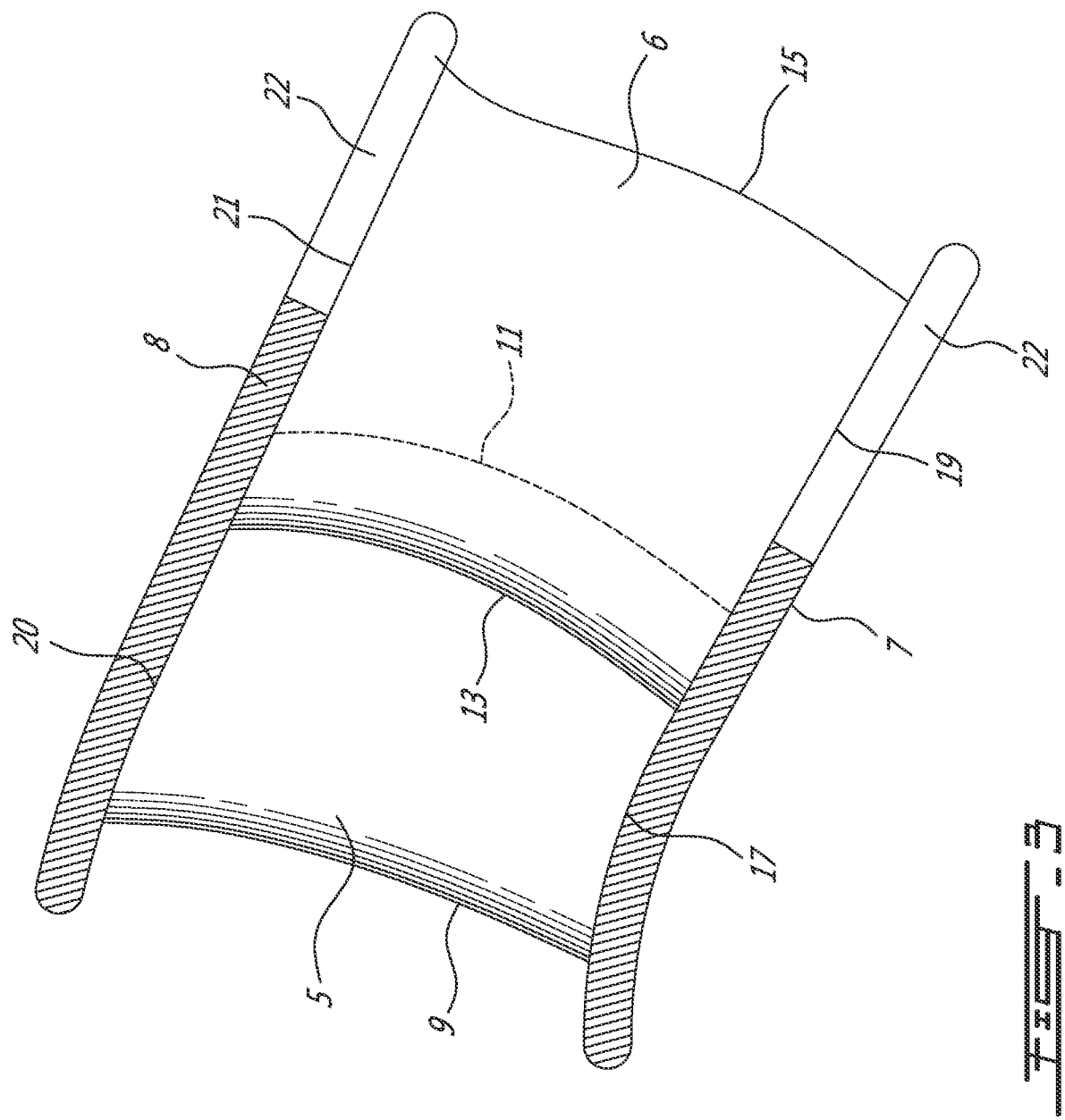

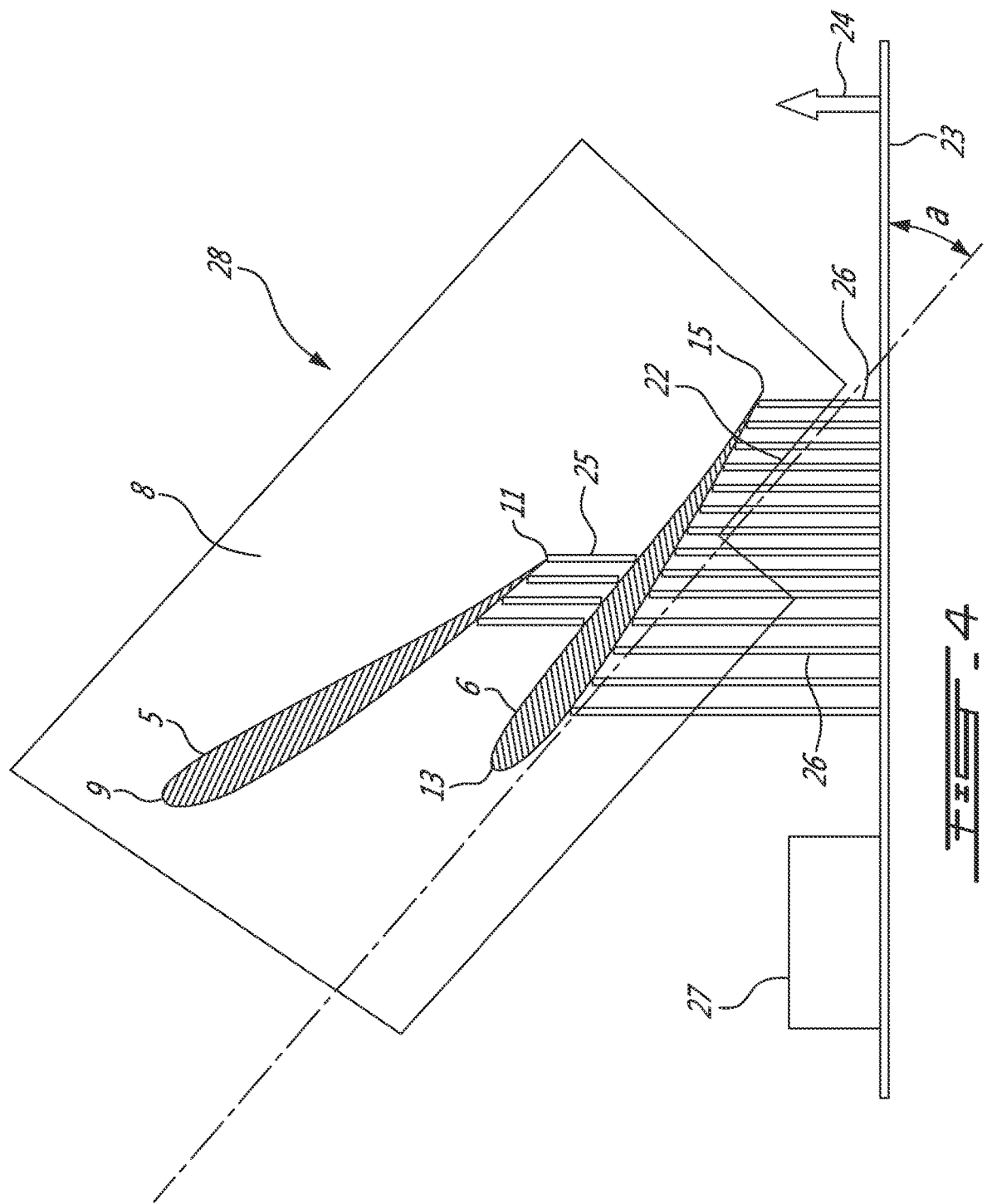

DOUBLE ROW COMPRESSOR STATORS

CROSS-REFERENCE TO RELATED APPLICATION

The present application is a divisional of U.S. patent application Ser. No. 16/153,526, filed on Oct. 5, 2018, the entire contents of which are hereby incorporated by reference.

TECHNICAL FIELD

The disclosure relates generally to gas turbine engines, and more particularly to a method of manufacturing a double row compressor stator having overlapping or interlaced pairs of stator blades.

BACKGROUND

Overlapping, interlaced or tandem pairs of compressor stator blades are described in U.S. Pat. No. 9,951,635 to Guemmer, U.S. Pat. No. 8,573,941 to Hoeger and U.S. Pat. No. 9,957,806 to Johann et al.

To manufacture such pairs of blades, the prior art suggests that each blade is manufactured separately and then the pairs are assembled together by brazing or welding of the metal components.

Improvement is desirable particularly in view of current metal fabrication techniques.

SUMMARY

In one aspect, the disclosure describes a method of manufacturing a compressor stator having an axis and a circumference, the compressor stator having: a first stator blade with a first leading edge and a first trailing edge; a second stator blade disposed a circumferential distance from the first stator blade, the second stator blade having a second leading edge disposed an axial distance from the first leading edge and a second trailing edge disposed an axial distance from the first trailing edge; the method comprising: using additive manufacturing to deposit and fuse together progressive layers of metal material commencing at a substrate to form the first stator blade, the second stator blade, at least one intermediate support structure disposed between the first stator blade and the second stator blade, and at least one primary support structure disposed between the substrate and at least one of: the first stator blade; and the second stator blade; and removing the at least one primary support structure and the at least one intermediate support structure.

In another aspect, the disclosure describes a precursor fabrication for additive manufacturing of a compressor stator, the compressor stator having an axis and a circumference, the precursor fabrication having: a first stator blade with a first leading edge and a first trailing edge; a second stator blade disposed a circumferential distance from the first stator blade, the second stator blade having a second leading edge disposed an axial distance from the first leading edge and a second trailing edge disposed an axial distance from the first trailing edge; a substrate; at least one primary support structure disposed between the substrate and at least one of: the first stator blade; and the second stator blade; and at least one intermediate support structure disposed between the first stator blade and the second stator blade.

Further details of these and other aspects of the subject matter of this application will be apparent from the detailed description included below and the drawings.

DESCRIPTION OF THE DRAWINGS

Reference is now made to the accompanying drawings, in which:

FIG. 2 shows an axial radially outward sectional view of overlapping pairs of upstream and downstream stator blades in accordance with the present description.

FIG. 3 is a radial sectional view along line 3-3 of FIG. 2.

FIG. 4 is an elevation view of an additive manufactured precursor fabrication showing an overlapping pair of upstream and downstream stator blades with primary supports extending from the base substrate on which progressive layers are deposited and intermediate supports between the stator blades, in accordance with the present description

DETAILED DESCRIPTION

Figure 1:
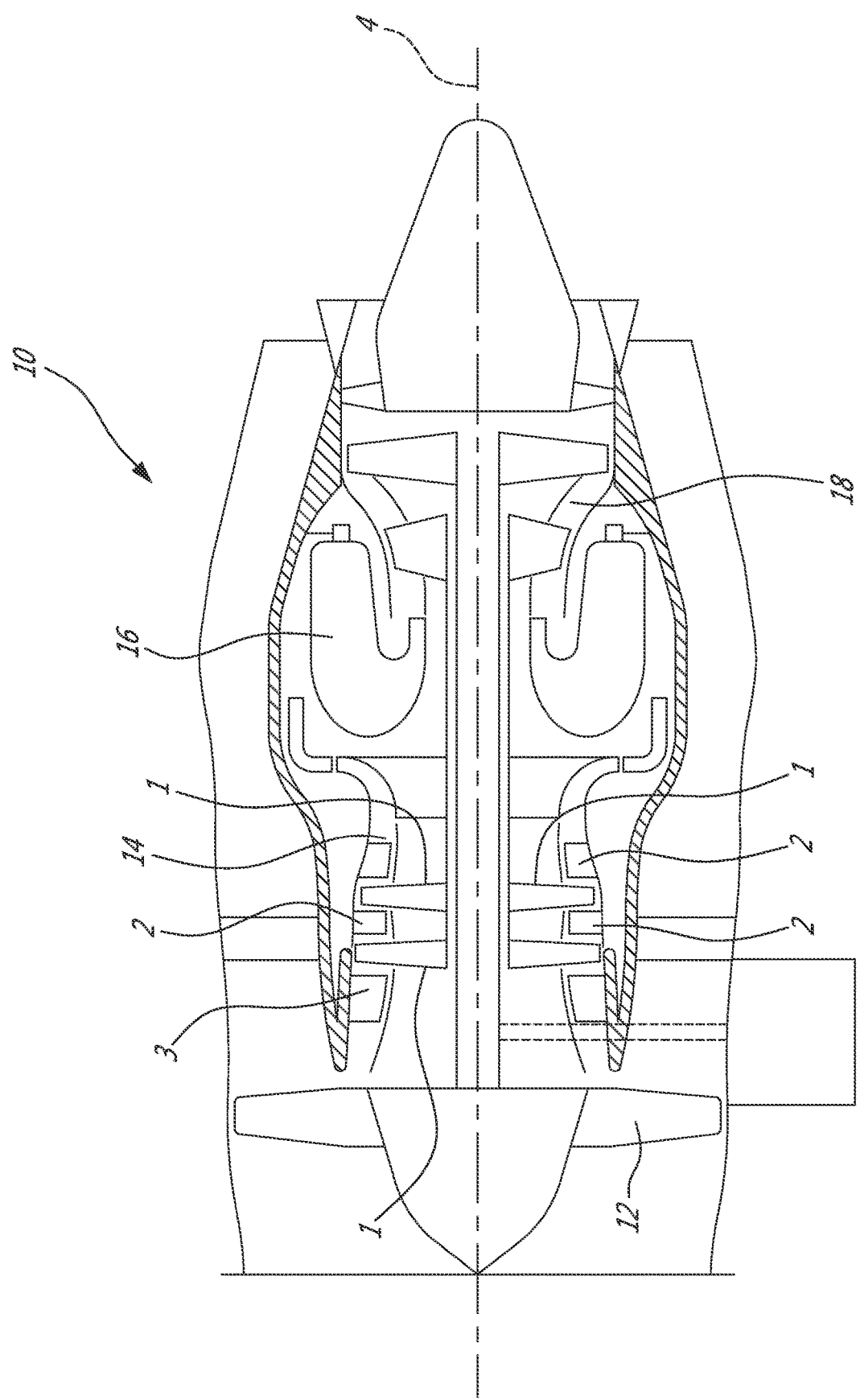
FIG. 1 shows an axial cross-section view of a prior art turbo-fan gas turbine engine.

FIG. 1 illustrates a gas turbine engine comprising in serial flow communication a fan 1 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Within the multistage compressor 14 there are multiple stages comprising rotor blades 1, stator blades 2 and guide vanes 3 that are arranged in rings of blades 1, 2, 3 in a circumferential array about a common engine axis 4. The rotor blades 1 and stator blades 2 usually include axially extending platforms (not shown in FIG. 1) to define the radial and axial surfaces of the gas flow path through the multistage compressor 14. The platforms and blades 1, 2 are generally manufactured together in a unit, i.e.: one blade per platform, using reductive machining from a solid metal blank or by metal casting. Each stator blade 2 with platform that is radially inward of the platform, is secured into a stator ring to form a multiple stator blade assembly. Further description in not considered necessary since the manufacture and assembly of rotors and stators for the compressors of gas turbine engines is within the common general knowledge of those skilled in the relevant technologies.

FIGS. 2-3 show an example embodiment wherein a pair of stator blades (a first stator blade 5 and a second stator blade 6) are joined to a radially inner platform 7 and a radially outer platform 8. The first stator blade 5 has a first leading edge 9 and a first trailing edge 11. The second stator blade 6 is disposed a circumferential distance from the first stator blade 5. The second stator blade 6 has a second leading edge 13 disposed an axial distance from the first leading edge 9 and a second trailing edge 15 disposed an axial distance from the first trailing edge 11.

The example illustrated shows the first stator blade 5 and second stator blade 6 being the same size and shape. Depending on the gas flow requirements, it will be understood that any arrangement or configuration of tandem/overlapping/interleaved blades 5, 6 may be used. For example blade 6 may be larger or smaller than blade 5, blade 6 can have a different surface configuration or is axially forward rather than aft of blade 5.

Referring to FIG. 3 the inner platform 7 spans between a radially inner end 17 of the first stator blade 5 and an inner end 19 of the second stator blade 6. The outer platform 8 likewise spans between a radially outer end 20 of the first stator blade 5 and an outer end 21 of the second stator blade 6. A transition fillet between the ends (17, 19, 20, 21) of the blades (5, 6) and the adjacent surfaces of the platforms (7, 8) is desirable to define the gas path.

FIG. 3 shows a removal access window 22 disposed in both the inner platform 7 and in the outer platform 8, the function of which is described below. The rotor may include only an inner platform 7 or only an outer platform 8 and accordingly a removal access window 22 would in such a case be provided in only one platform 7, 8.

Reference is made to FIG. 4 which shows an example of how the additive manufacturing of tandem/overlapping/interleaved blades 5, 6 and attached platforms 7, 8 may be accomplished. Additive manufacturing uses metal particles to deposit and fuse together progressive layers of metal material commencing at a substrate 23 and progressing upwardly as indicated by arrow 24. Progressive layers form the first stator blade 5, the second stator blade 6, at least one intermediate support structure 25 disposed between the first stator blade 5 and the second stator blade 6, and at least one primary support structure 26 disposed between the substrate 23 and at least one of: the first stator blade 5; and the second stator blade 6.

In the example illustrated, the primary support structure 26 does not extend to the first stator blade 5 nor to the outer platform 8. If required the primary support structure 26, made of thin posts deposited in layers together with the blades 5, 6 and platform 8, can extend upwards. However current additive manufacturing processes allow for layers to be deposited to form an angle relative to the substrate 23 that is in the range between 45 degrees and 90 degrees (i.e.: vertical). Accordingly as illustrated the additive manufacturing process does not require supports 25, 26 to deposit material where the angle "a" relative to the substrate is 45 degrees or more.

After the blades 5, 6 and platforms 7, 8 with supports 25, 26 are fully deposited, the supports 25, 26 are removed. The removal access window 22 provides access to the supports 26, 27 and to the gas path surfaces of the blades 5, 6 and platforms 7, 8, the at least one primary support structure and the at least one intermediate support structure.

By inserting a machining tool through the removal access window 22 the tool can remove at least one of: the at least one primary support structure 26; and the at least one intermediate support structure 25. After removal a closure piece 27 that matches the size of the removal access window 22 and continues the contours of the platform 8 is fitted and secured within the removal access window 22 by brazing or welding for example. Before securing the closure piece 27, manufacturing can include inserting a finishing tool through the removal access window 22 to remove excess surface material from at least one of: first stator blade 5; the second stator blade 6; the inner platform 7; and the outer platform 8 with the finishing tool.

For further clarity, it will be understood that FIG. 4 shows a precursor fabrication 28 for additive manufacturing of a compressor stator, the compressor stator having an axis 4 (FIGS. 1 and 2) and a circumference. The precursor fabrication 28 includes: a first stator blade 5 and a second stator blade 6 disposed a circumferential distance from the first stator blade 5. The second stator blade 6 has a second leading edge 13 disposed an axial distance from the first leading edge 9 and a second trailing edge 15 disposed an axial distance from the first trailing edge 11. Additive manufacturing commences by depositing layers of metal material on the substrate 23 and includes forming of at least one primary support structure 26 disposed between the substrate 23 and at least one of: the first stator blade 5; and the second stator blade 6; and at least one intermediate support structure 25 disposed between the first stator blade 5 and the second stator blade 6. As shown in FIG. 4, the platforms 7, 8 can be formed with the removal access window 22 at the same time as the closure piece 27 is formed on the substrate 23.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method of manufacturing a compressor stator having an axis and a circumference, the compressor stator having:
    a first stator blade with a first leading edge and a first trailing edge;
    a second stator blade disposed a circumferential distance from the first stator blade, the second stator blade having a second leading edge disposed an axial distance from the first leading edge and a second trailing edge disposed an axial distance from the first trailing edge;
    the method comprising:
        using additive manufacturing to deposit and fuse together progressive layers of metal material commencing at a substrate to form the first stator blade, the second stator blade, at least one intermediate support structure disposed between the first stator blade and the second stator blade, and at least one primary support structure disposed between the substrate and at least one of: the first stator blade; and the second stator blade; and
        removing the at least one primary support structure and the at least one intermediate support structure.

2. The method according to claim 1, wherein the compressor stator includes:
    an inner platform spanning between an inner end of the first stator blade and an inner end of the second stator blade; and an outer platform spanning between an outer end of the first stator blade and an outer end of the second stator blade; and
    a removal access window disposed in at least one of: the inner platform; and the outer platform; and
    the method including:
        inserting a machining tool through the removal access window to remove at least one of: the at least one primary support structure; and the at least one intermediate support structure, with the machining tool; and
        securing a closure piece within the removal access window.

3. The method according to claim 2, wherein the method includes, before securing the closure piece, inserting a finishing tool through the removal access window to remove excess surface material from at least one of: the first stator blade; the second stator blade; the inner platform; and the outer platform.

* * * * *